United States Patent [19]

Stammann et al.

[11] Patent Number: 4,705,843
[45] Date of Patent: Nov. 10, 1987

[54] PROCESS FOR THE PRODUCTION OF SUBSTITUTED POLYARYL ETHERS

[75] Inventors: Günter Stammann, Cologne; Johann Grolig; Helmut Waldmann, both of Leverkusen, all of Fed. Rep. of Germany

[73] Assignee: Bayer Aktiengesellschaft, Leverkusen, Fed. Rep. of Germany

[21] Appl. No.: 720,942

[22] Filed: Apr. 8, 1985

[30] Foreign Application Priority Data

Apr. 19, 1984 [DE] Fed. Rep. of Germany ....... 3414882

[51] Int. Cl.$^4$ ..................... C08G 59/40; C08G 59/42; C08G 65/00
[52] U.S. Cl. ................... 528/212; 528/214; 528/215; 528/216; 528/217; 528/218
[58] Field of Search ........... 528/212, 214–218

[56] References Cited

U.S. PATENT DOCUMENTS

| 3,234,183 | 2/1966 | Hay | 528/212 |
| 3,256,243 | 6/1966 | Blanchard et al. | 528/212 |
| 3,306,874 | 2/1967 | Hay | 528/212 |
| 3,306,875 | 2/1967 | Hay | 528/215 |
| 3,549,670 | 12/1970 | Spousta | 528/212 |
| 3,573,257 | 3/1971 | Nakashio et al. | 528/212 |
| 3,767,619 | 10/1973 | Cooper | 528/212 |
| 4,032,512 | 6/1977 | Bennett et al. | 528/215 |
| 4,341,890 | 7/1982 | Lindvay | 528/212 |

FOREIGN PATENT DOCUMENTS

| 0061691 | 3/1982 | European Pat. Off. . |
| 1745432 | 2/1973 | Fed. Rep. of Germany . |
| 2358729 | 6/1974 | Fed. Rep. of Germany . |
| 2446425 | 4/1975 | Fed. Rep. of Germany . |
| 3140026 | 4/1983 | Fed. Rep. of Germany . |
| 1189405 | 2/1968 | United Kingdom . |
| 1430615 | 3/1976 | United Kingdom . |

*Primary Examiner*—John Kight
*Assistant Examiner*—M. L. Moore
*Attorney, Agent, or Firm*—Connolly and Hutz

[57] ABSTRACT

The invention relates to a process for the production of substituted polyarylethers from par-substituted phenols.

11 Claims, No Drawings

PROCESS FOR THE PRODUCTION OF SUBSTITUTED POLYARYL ETHERS

This invention relates to a process for the production of substituted polyaryl ethers from para-substituted phenols.

Substituted polyaryl ethers having certain substitution patterns and processes for the production thereof by oxidation of 2,6-disubstituted phenols are known (for example U.S. Pat. Nos. 3,306,874 and 3,306,875). Polyaryl ethers of high molecular weight are obtained according to these patents only when using phenols whose orthopositions are substituted and which react in the paraposition.

It is known from U.S. Pat. No. 3,306,875 and from "Kirk-Othmer, Encyclopedia of Chemical Technology", Vol 18, New York, 1982, page 602, that 4-halophenols do not produce polymers under the normal conditions of oxidative coupling but, on the other hand, react under stronger conditions as phenolates or in the presence of stoichiometric quantities of bases with substitution of the halogen so that halogen-free poly(1,4-phenylene oxide) is formed.

It is known from the "Encyclopedia of Polymer Science and Technology", Vol 10, pages 92 to 94, New York 1969, that phenols with unsubstituted ortho-positions produce complex and generally lower molecular-weight products.

It has now been found that polyaryl ethers from para-substituted phenols with at least one free ortho-position can be produced by oxidative coupling with retention of the para-substituent. The fact that the reaction according to the invention can be effected using catalyst systems for forming polyaryl ethers substituted in this way was quite surprising.

The present invention thus provides a process for the production of polyaryl ethers which is characterised in that phenols corresponding to the general formula (I):

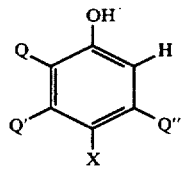
(I)

in which
- X represents halogen such as fluorine, chorine and bromine or cyano or optionally substituted alkyl containing from 1 to 20 C atoms, aryl containing from 6 to 10 C atoms, aralkyl containing from 7 to 20 C atoms, cycloalkyl containing from 5 to 10 C atoms and heterocyclic radicals containing from 5 to 12 ring atoms of which up to 3 C atoms can be replaced by hetero atoms such as N,O,S, and the groups $X_1$, $X_2$ and optionally Z, and in which
- Q, Q', Q" independently represent hydrogen or substituents of the type described under X, providing that they contain not more than 3 C atoms, as well as—independently of this restriction—optionally of type Z, are oxidized under elevated pressure in the presence of a catalyst.

The process according to the invention uses parasubstituted phenols corresponding to the general formula (I) oxidizing agents and catalysts containing at least copper or a copper compound and an organic nitrogen base or a phosphorus compound as starting materials. The substituent X of the phenols in the para-position should be resistant to oxidation under the reaction conditions. The substituents or radicals X can be further substituted, for example by cyano, halogen, such as fluorine and chlorine, non-primary amine groups and-/or ether groups, and they consist of up to 20 C atoms including these substituents which may be present. The radicals $X_1$, $X_2$ and optionally Z relate to cases described below.

Examples of suitable radicals X include: methyl, trifluoromethyl, ethyl, butyl, tert.-butyl, 1,1-dimethylpropyl, 1,1,2,2-tetramethylpropyl, dodecyl, cyclohexyl, perchlorocyclohexyl, 4-methoxycyclohexyl, cyclopentyl, cycloheptyl, benzyl, 1-methyl-1-phenylethyl, 1-methyl-1-(4-chlorophenyl)-ethyl, phenyl, 2-chlorophenyl, 4-fluorophenyl, 4-tert.-butylphenyl, pentachlorophenyl, 4-nitrophenyl, 4-pyridyl, 2-oxazolyl, 4-morpholinyl, imidazolyl, quinolyl, 1-naphthyl, 2-naphthyl and the like. Tert.-butyl, 1,1-dimethylpropyl, 1,1,2,2-tetramethylpropyl, 1-methyl-1-phenylethyl and phenyl are preferred radicals.

The group $X_1$ includes radicals which are bonded via an O-atom, an S-atom or a carbonyl group with the aromatic phenol ring; in particular, it covers radicals corresponding to the formulae (1)

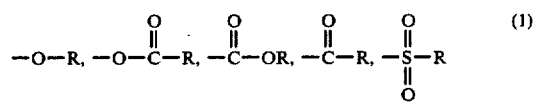
(1)

wherein R represents optionally substituted hydrocarbon radicals or heterocyclic radicals of the type defined above under X, i.e. the phenolic starting materials containing the grouping $X_1$ are, for example, hydroquinone monoethers, hydroquinone monoesters, para-hydroxybenzoic acid estens or para-hydroxyphenyl sulphones.

The group $X_2$ covers radicals which are bonded via nitrogen to the aromatic ring of the phenol, in particular those corresponding to formulae (2)

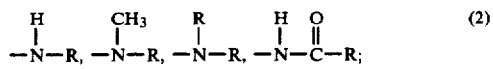
(2)

wherein
R has the meaning given to formulae (1), i.e. the phenolic starting materials which contain the $X_2$ group are, for example, N-substituted para-amino phenols.

The substituents Q, Q' and Q" are hydrogen or substituents of the type defined under X containing not more than 3 C atoms, for example methyl, methoxy, ethyl, ethoxy, trifluoromethyl or 1-propyl.

Q, Q' and Q" preferably represent hydrogen and X preferably represents halogen, alkyl and aralkyl.

A special case of suitable starting materials a) exists if X and Q' or X and Q" or Q and Q' each together represent divalent substituents and thus form a fused ring system. Such starting materials a) can be described by general formulae Ia) to Ic) in which the phenols corresponding to formulae Ib) and Ic) are preferred.

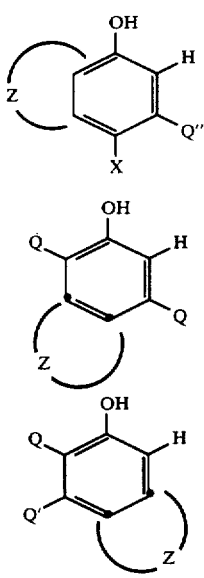

Therein the substituents Q, Q' and Q'' correspond to the definitions given in formula (I), preferably hydrogen. The divalent radicals Z correspond, for example, to those specified in the formulae below and can even be further substituted, for example by $C_1$-$C_3$-alkyl, $C_6$-$C_{10}$-aryl and chlorine and fluorine, for example the following divalent radicals

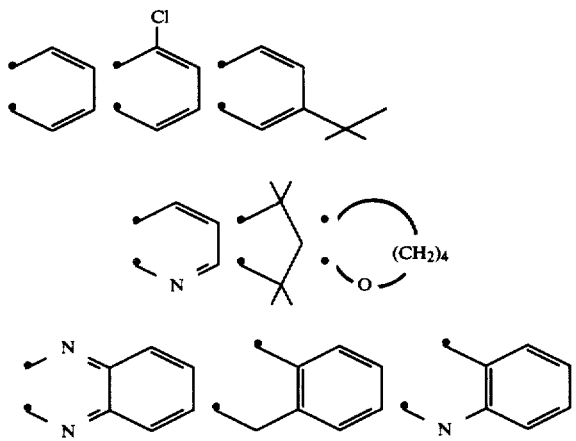

Suitable phenolic starting materials (a) for the process according to the invention, include, for example, 4-methylphenol, 4-tert.-butylphenol, 4-(1,1-dimethylpropyl)-phenol, 4-(1,1,2,2-tetramethylpropyl)-phenol, 4-dodecylphenol, 4-cyclohexylphenol, 4-(perchlorocyclohexyl)-phenol, 4-(4-methoxycyclohexyl)-phenol, 4-benzylphenol, 4-(1-methyl-1-phenylethyl)-phenol, 4-[1-methyl-1-(4-chlorophenyl)-ethyl]-phenol, 4-phenylphenol, 4-(2-chlorophenyl)-phenol, 4-(4-fluorophenyl)-phenol, 4-(4-tert.-butylphenyl)-phenol, 4-(pentachlorophenyl)-phenol, 4-(4-nitrophenyl)-phenol, 4-(pentachlorophenyl)-phenol, 4-(2-pyridyl)-phenol, 4-(2-oxazolyl)-phenol, 4-(4-pyridyl)-phenol, 4-(4-morpholinyl)-phenol, 2-chloro-4-methylphenol, 3-chloro-4-tert.-butyl-phenol, 2-fluoro 4-tert.-butylphenol, 2-methoxy-4-tert.-butylphenol, 2-phenoxy-4-tert.-butylphenol, 3-(4-tert.-butylphenoxy)-4-tert.-butylphenol, 3-(4-fluorophenoxy)-4-tert.-butylphenol, 4-methoxyphenol, 4-phenoxyphenol, 4-hydroxydiphenyl-sulphone, 4-hydroxydiphenylcarbonate, 4-fluorophenol, 2,4-difluorophenol, 4-chlorophenol, 2,4-dichlorophenol, 3,4-dichlorophenol, 4-bromophenol, 4-iodophenol, 4-(N-methyl-amino)-phenol, 4-(N-phenylamino)-phenol, 4-N-methyl-N-phenylaminophenol, 4-hydroxybenzophenone, 4-benzoic acid-4-hydroxyphenyl ester, N-benzoyl-4-aminophenol and N-(4-hydroxyphenyl)-ethylurethane, 3,4,5-trichlorophenol, 2,3,4-trichlorophenol, 2,3-dichloro-4-methylphenol and 4-chloro-3,5-dimethylphenol.

Further suitable starting materials (Ia) include, for example, α-naphthol, β-naphthol, 8-chloronaphthol-2, 4-chloronaphthol-2, 4-chloronaphthol-1, 6-hydroxyquinoline, 7-hydroxyquinoline, 2-hydroxyphenazine, 2-hydroxycarbazole, phenanthrole-2 and 1,1,3,3-tetramethyl-5-indanole.

Preferred phenolic starting materials corresponding to formula (I) include 2,4-dichlorophenol, 3,4-dichlorophenol, 4-chlorophenol as well as phenols bearing hydrocarbon radicals as substituent X. 4-chlorophenol, 4-tert.-butylphenol, 4-(1,1-dimethylpropyl)-phenol, 4-(1,1,2,2-tetramethylpropyl)-phenol, 4-(1-methyl-1-phenylethyl)-phenol and 4-phenylphenol are particularly preferred.

In order to produce mixed polyaryl ethers (copolymers) it is possible to react two or more, preferably two different phenols corresponding to formula (I) with each other in optional proportions to form polyaryl ethers according to the invention.

The reaction of the phenolic starting materials (I) to form the polyaryl ethers according to the invention takes place in the presence of one or more oxidizing agents. Oxygen and compounds of $Ce^{4+}$, $Cr^{6+}$, $Fe^{3+}$, $Mn^{4+}$, $Ag^+$ and $Cu^{2+}$, for example, are suitable as oxidizing agents. These compounds should be at least partially dissolved under the reaction conditions. If they exist as sparingly soluble compounds, for example oxides, they can be used in conjunction with activating halides. Copper-II-compounds are preferred oxidizing agents. Thus, it is possible to use, for example, sparingly soluble copper-II-oxide or basic copper-II-carbonate which is activated with a catalytic quantity of a chloride, in particular copper-II-chloride and/or pyridine hydrochloride. After the reaction with the phenolic starting material, the separated copper compound can be used again, for example after treatment with air.

If copper-II-compounds are used as oxidizing agents, the addition of a further catalyst can be omitted. However, an amine should be added.

Oxygen, for example in the form of air, is a particularly preferred oxidizing agent. If oxygen is used in undiluted form, it should generally be added in small quantities or with a small gas through-put. Oxygen is preferably diluted with one or more inert gases, for example helium, argon, carbon dioxide and nitrogen, and air is particularly preferred.

The partial oxygen pressure should be in a ratio to the sum of partial pressures of the inert gases of from 1:100 to 1:1, preferably in a ratio of from 1:100 to 1:4.

To control the molecular weight and the reaction rate, it is also possible to use carbon monoxide instead of or in addition to the above-mentioned inert gases. Gas mixtures of carbon monoxide and approximately 5 to 25% by volume of air, for example, can be used.

The phenolic starting materials corresponding to formula (I) are reacted to form polyaryl ethers in the presence of catalysts containing, for example, (c) copper compounds and (d) organic nitrogen bases or phosphorus compounds or in the presence of catalyst systems containing components (c) and (d) or complex compounds with these components.

Suitable catalysts include copper compounds, for example organic and inorganic compounds of monovalent and/or divalent copper such as copper-I-chloride, copper-II-chloride, copper-I-bromide, copper-II-bromide, copper-I-fluoride, copper-II-fluoride, copper-I-iodide, copper-II-nitrate, copper sulphate, basic copper chloride or atakamite ($CuCl_2 \times Cu(HO)_2$), copper hydroxide, copper oxychloride, copper-II-acetate, copper-II-oxalate, copper-II-laurate, copper-II-palmitate, copper-II-salicylate, copper-I-tetrachloroaluminate, and chelate complexes such as copper-II-bis-(2-aminophenolate). Hydrates ammonium salts and amine complexes of the above-mentioned compounds can optionally also be used.

If soluble chlorides or bromides or compounds which readily release chloride ions or bromide ions under reaction conditions are added, insoluble or sparingly soluble copper compounds, for example, copper-I-oxide, copper-II-oxide, copper-II-hydroxide, copper-II-chromite, basic copper-II-carbonate ($Cu(CO_3)_2$ x $Cu(OH)_2$) etc. or finely-divided metallic copper can also be used.

Copper-II-acetate, copper-II-chloride (also as hydrate), copper-II-oxychloride ($Cu_2OCl_2$), also copper-II-oxide and basic copper carbonates ($CuCO_2$ x $Cu(OH)_2$) in mixtures with copper-II-chloride or activating chlorides are preferably used as compounds c).

The quantity of catalyst (c) is generally from 0.1 to 30 mol % based on phenolic starting material (a), preferably from 0.1 to 15 mol %.

An organic nitrogen base (d) is used as a further catalyst component for the process according to the invention. This component (d) can be a tertiary, secondary, primary, in particular a primary amine branched in α-position. Suitable amines for the process according to the invention are mentioned by way of example in U.S. Pat. Nos. 3,134,753, 3,306,874, 3,306,875 and DE-OS No. 3 029 429. Heterocyclic nitrogen bases containing more than one nitrogen atom in the heterocyclic ring system are also suitable as catalyst component (d). For example, 1-butylamine, dimethylamine, triethylamine, tert.-butylamine, neopentylamine, 1,4-dimethylpentylamine, N-ethylaniline, N,N-diethyl-aniline, pyridine, 4-(dimethylamino)-pyridin, picolines, lutidines, quinoline, isoquinoline, carbazole, imidazole, pyrazole, benzimidazole, phenazine, triazole, tetramethylethylene diamine, tetramethyltetramethylene diamine, 1,4-diazabicyclo(2,2,2)-octane, 1, 10-phenanthroline, 1,4,8,11-tetramethyl-1,4,8,11-tetraazacyclotetradecane, N,N,N',N'-tetrakis (diphenyl-phosphinomethyl)-ethylene diamine and ethylene bis(salicylimine) can be used. Preferred organic nitrogen bases (d) include tertiary amines and heteroaromatic substances with from 1 to 2 N-ring atoms, and pyridine, quinoline, benzimidazole, isoquinoline and tetramethylethylene diamine are particularly preferred.

Polymeric organic amines can also be used as catalyst components (d), for example polyethylene imines or polyvinyl pyridine. The amines (d) can be used in free form and as hydrochlorides or can be complexed with metal salts, in particular as metal halide amine complexes. Pyridine hydrochloride and pyridine complexes of halogen-containing copper compounds are particularly preferred. Of the polymeric amines, polyvinyl pyridine, for example, is preferred for the complexing of copper-II-chloride.

Of the possible catalyst combinations, those containing copper-II-acetate, copper-II-chloride or copper-I-chloride and pyridine or tetramethylethylene diamine and the three fold combination of copper-II-oxide copper-II-chloride (hydrate) and pyridine hydrochloride are particularly preferred.

The organic nitrogen base (d) is used in such a quantity that there are approximately 0.3 to 4 mol of basic nitrogen atoms, preferably from 0.3 to 2.2 mol, per 1 mol of copper ions in catalyst C.

The use of regulators and co-catalysts is known (for example U.S. Pat. No. 3,306,875, DE-OS No. 2 228 071). These additions are also possible when producing the polyaryl ethers according to the invention, also metal salts of Fe, Co, Ni, Mn and Pb such as $FeCl_3$, $Fe(OAC)_3$, $MnCl_2$ etc.

Soluble metal salts whose metal cations can be present in various valency states, for example those mentioned above, can be used to accelerate the reaction and/or to regulate the molecular weight. The quantity by weight of these additions of metal salts which are used, in particular, as metal halides, is generally smaller than the quantity by weight of the catalyst component (c).

Organic phosphorus compounds can be used instead of or in addition to the amine bases (d) of the catalyst. For example, substituted phosphines, phosphine oxide, phosphoric acid ester and phosphorous acid ester can be used as regulator additions in quantities by weight corresponding to from 20 to 100% by weight, preferably from 40 to 60% by weight of the amine base (d). Halogen-containing phosphorous compounds, for example $PCl_3$, $PCl_5$, $PCl_2(C_6H_5)_3$ can also be used. The organic phosphorus compounds can also be used instead of the amine (d). Chelate-forming agents containing phosphorus as well as an amine nitrogen are also suitable as catalyst component (d).

The reaction according to the invention is generally carried out in the presence of solvents capable of dissolving, under the reaction conditions, the phenolic starting material (a) and at least in part the catalyst with components (c) and (d).

Suitable solvents should be stable under these reaction conditions. For example, halogenated hydrocarbons such as dichloromethane, chloroform, carbon tetrachloride, 1,1,2,2-tetrachloroethane, chlorobenzene, dichlorobenzenes and other chlorinated aromatic substances, ketones such as benzophenone, ethers such as diphenyl ether, amides such as dimethylformamide, N-methylpyrrolidone, nitromethane and sulpholane can be used.

The phenolic starting material (a) can also be used without further solvent so that unreacted excess starting material is used as the reaction medium. This may be advantageous if high proportions of low molecular weight products are desired.

The reaction mixture preferably contains about 50 to 90% by weight of solvent based on the total quantity by weight of all the components contained in the reaction medium.

The reaction of the phenolic starting materials corresponding to formula (I) to form the polyaryl ethers according to the invention takes place at reaction temperatures of from 50° to 220° C., preferably from 50° to 180° C., and in particular from 100° to 180° C.

It may be advantageous to adjust a suitable temperature, for example to the starting material (a). The pressure is generally from 10 bar to about 1000 bar, preferably from 30 to 250 bar.

If no gaseous oxidizing agent is used, the pressure can be adjusted, for example, by the vapour pressure of the solvent or by an inert gas.

The molecular weight of the polyaryl ethers according to the invention, for example the molecular weight distribution, can be influenced by suitable measures, for example by the reaction parameters. If molecular weights which are as high as possible are to be attained, the oxidizing agent can be used, for example, in a stoichiometric ratio or with a stoichiometric excess of up to about 20%, and the reaction is allowed to take place at from 100° to 180° C. for a period of from 1 hour to about 2 days, the catalyst containing component (c) and one of the preferred components (d). The oxygen partial pressure can be at least 10% of the total pressure, measured at the beginning of the reaction, and the total pressure at the reaction temperature can be at least 30 bar.

At a lower temperature, lower total pressure and/or with a sub-stoichiometric quantity of oxidizing agent as well as a shortened reaction time, it is possible to obtain lower conversions of the phenolic starting materials and polyaryl ethers having a lower molecular weight $M_n$.

The addition of iron, manganese or lead salts can have a similar effect. A low molecular weight $M_n$ can be adjusted to greater advantage using carbon monoxide and/or the above-mentioned organic phosphorus compounds as it is possible to regulate the molecular weight in this way even with high conversions of the phenolic starting materials.

In terms of the process, the polyaryl ethers can be produced continuously or batch-wise in suitable pressure-reactors or autoclaves. For example, the reaction can be carried out batch-wise in a stirrer-equipped autoclave or the reaction can be carried out in an autoclave while introducing or passing through an oxygen-containing reaction gas. A cascade of stirrer-equipped reactors or a cascade of jet nozzle reactors, for example, is suitable for continuous production, and the gas phase can be passed in a co-current, counter-current or cross-current.

The solid-liquid reaction mixtures can be worked-up in various ways after releasing the pressure to normal pressure. For example, the solid catalyst can be separated by a conventional solid-liquid separation process. Separated catalyst can be recycled into the reaction and used again.

In particular it is possible, when using the preferred catalyst combinations in the preferred quantities, to separate the catalyst almost completely in solid form.

The reaction solution can then be worked up, optionally after an acid wash, by distillation or precipitation. In the case of distillation, solvents, any unreacted phenolic starting materials and oligomer fractions in addition to the polymeric residue are obtained in apparatus having various pressure and temperature stages. If the product is precipitated, the reaction solution is introduced with vigorous stirring into a precipitation medium, for example a lower alcohol, preferably a $C_1$–$C_3$ alcohol which is adjusted to an acidic or neutral condition, the polymer being precipitated and the remaining constituents remaining in the solution. These remaining constituents can be worked up, for example by distillation, after separating the polymer. The polymer obtained can be further purified or fractionated by precipitation via concentration or temperature gradients.

Oligomer fractions of low molecular weight can be converted into higher molecular weight products by recycling them into the reaction, preferably together with phenolic starting materials (a).

The invention also relates to the products of the process which essentially have as the structural elements ortho-bonded and/or meta-bonded polyaryl ethers and generally have one substituent X per ether-bonded aromatic ring. The products of the process according to the invention represent oligomeric or polymeric polyaryl ethers and generally exist as mixtures with specific molecular weights or molecular weight distributions. With modern methods of separation it is possible to isolate individual compounds in the lower oligomer range.

The polyaryl ethers according to the invention can be described by means of formula (II). The average molecular weights $M_n$ are from about 500 to 500,000, preferably from 1,500 to 50,000. The molecular weights $M_w$ can amount to up to 100 times these values.

The polyarylethers produced according to the invention can be described essentially by the general formula (II):

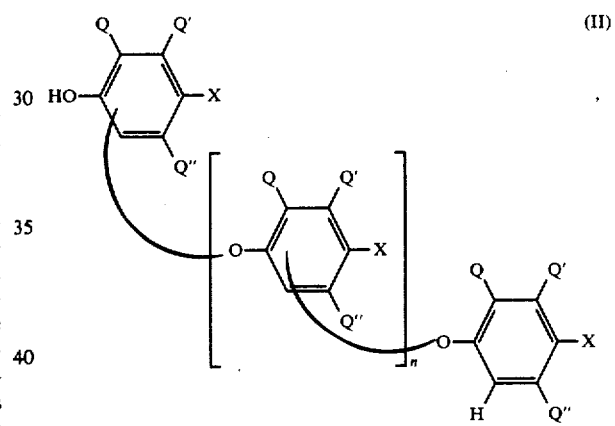

in which
n represents an integer from 2 to 200,000 and
Q, Q' and Q" have the meaning given in formula I.

If n represents a number >5, the polyaryl ethers are novel. In novel polyaryl ethers, n represents an integer from 5 to 200,000, preferably from 15 to 200,000.

In addition to the ether bonds which can form up to at least 90 mol % (based on a monomer unit), up to 10 mol % (based on monomer units) of nucleus-nucleus bonds with a corresponding number of chain-form phenol groups can be present to a lesser extent.

The products of the process can also have quinoid structures, in particular at the chain ends.

The representation of the polyaryl ethers according to the invention as a formula serves merely as a general characterisation. For example, there can be present up to 10 mol % (based on monomer units) of structures which are formed, starting from 4-halogen phenols, by the formation of an ether bond with substitution of the halogen. Branched aryl ether structures are also possible.

The polyethers produced according to the invention were found to be chemically uniform in broad molecular weight ranges (for example according to IR and NMR spectra). They predominantly exist as ortho-linked polyethers.

The physical properties of the products according to the invention can differ greatly depending on the type of constituents and the molecular weight. They generally form brittle, resin-like materials of a light to dark brown colour at room temperature. However, they can also exist as light amorphous powders. In the molecular weight range of up to $M_n$ 1000, the softening points of the oligomer mixtures generally lie at from 50° to 120° C., but they can also still be liquid at room temperature. If the molecular weights $M_n$ exceed about 5000, the polyaryl ethers according to the invention generally have softening points above 250° C. Depending on the type of substituents, decomposition begins in the range from about 220° C. to about 250° C. The polyaryl ethers according to the invention are generally substantially insoluble in water but readily soluble in aprotic, polar organic solvents, i.e. if no hydrophilic substituents are present in the radicals X or Q, Q' Q". The solubility in alcohols and hydrocarbons depends greatly on the type of constituents. For example, the alkyl-substituted polyethers can be dissolved in aromatic and aliphatic hydrocarbons such as benzene and n-hexane.

The polyaryl ethers according to the invention corresponding to general formula (I) can be used as plastics additives, as emulsifiers, preliminary products for them, as laquer components and as preliminary stages for thermosetting plastics.

EXAMPLES

General Experiments

The reaction of the phenols with air was carried out in 0.3 l or 0.7 l special steel autoclaves or in an enamalled 1.3 l steel autoclave, as follows:

After charging the autoclave with the liquid and solid starting materials and catalysts (given in % by weight), air and, in some experiments, carbon monoxide and air or nitrogen and air were applied at the specified pressures at room temperature. The mixture was heated to the reaction temperature in a period of from 30 to 40 minutes with stirring and maintained at this temperature for the specified reaction time. The application of the gas mixture and the heating process were optionally repeated in several cycles. At the end of the reaction phase, the pressure was released and a gas sample was subjected to analysis by gas chromatography.

The reaction mixtures obtained were filtered to remove precipitated solids, for example the catalyst. The reaction solutions thus obtained were then subjected to quantitative analysis by gas chromatography to determine the conversion of the phenolic starting material. The molecular weight distribution was then determined by gel permeation chromatography (see description of method below).

The reaction products are characterised by the numerical mean value of the molecular weight ($M_n$) and the weight mean value of the molecular weight ($M_w$) without taking into consideration the starting phenol. (The molecular weight indicating the upper limit of 70% of the polymer composition as upper limit according to the integral of the distribution curve ($M_{70}$) is also given.

Gel permeation chromatography—description of method

Chromatography was carried out in an in-house liquid chromatograph equipped with a separation column having a total length of 180 cm and a diameter of 0.8 cm (TSK gels 2000/3000/4000/6000/GMH 6/GMH 6 of Toya Soda, $\bar{d}p=10$ μm) and two detectors (Waters fixed wave UV detector M 440,λ-254 nm and Waters Differential refractometer R 401) using freshly distilled dichloromethane as eluent at 25° C. and at a flow rate of 1.0 cm$^3$/min.

Evaluation was carried out against a calibration curve according to the conventional commercial ionically polymerised polystyrene standard, using a table-top computer to obtain the differential and integral mass distribution as well as $M_n$ and $M_w$.

EXAMPLE 1

Weighed quantity: 70.5% of ortho-dichlorobenzene (433 g), 27.3% of 4-chlorophenyl, 1.1% of copper-II-acetate and 1.1% of pyridine.

Conditions: 100 bar air, 1 hour at 180° C. in 1.3 l autoclave.

Conversion of 4-chlorophenol: 94.5%.

$M_n$: 2400, $M_w$: 120 000, $M_{70}$: 8300.

EXAMPLE 2

Weighed quantity as in Example 1.

Conditions: 4 reaction cycles each with fresh gas mixture at 100 bar CO/24 bar air, 4×1 hour at 180° C. in a 1.3 l autoclave.

Conversion of 4-chlorophenol: 84%.

$M_n$: 1600, $M_w$: 24,000, $M_{70}$: 4200.

EXAMPLE 3

Weighed quantity as in Example 1.

Conditions: 4 reaction cycles each with fresh gas mixture at 100 bar $N_2$/25 bar air, 4×1 hour at 180° C. in a 1.3 l autoclave.

Conversion of 4-chlorophenol: 96%.

$M_n$: 2800, $M_w$: 560,000, $M_{70}$: 9500.

EXAMPLE 4

Weighed quantity: 69.9% of ortho-dichlorobenzene (100 g), 27.0% of 4-chlorophenol, 1.0% of copper-II-oxide, 1.0% of copper-II-chloride and 1.0% of triphenylphosphine.

Conditions: 2 reaction samples each with fresh gas mixture at 100 bar CO/25 bar air, 2×1 hour at 180° C. in a 0.3 l autoclave.

Conversion of 4-chlorophenol: 49%.

$M_n$: 1200, $M_w$: 1600, $M_{70}$: 3500.

EXAMPLE 5

Weighed quantity: 69.89% of orthodichlorobenzene (443 g), 26.98% of 4-chlorophenol, 1.05% of copper-II-oxide, 1.05% of copper-II-chloride, 1.05% of pyridine hydrochloride.

Conditions: 100 bar air, 1 hour at 150° C. in 1.3 l autoclave.

Conversion of 4-chlorophenol: 97%.

$M_n$: 2000, $M_w$: 582,000, $M_{70}$: 9500.

EXAMPLE 6

Weighed quantity as in Example 5.

Conditions: 2 reaction cycles each with fresh gas mixture at 60 bar $N_2$/60 bar air, 2 times 1 hour at 150° C. in a 1.3 l autoclave.

Conversion of 4-chlorophenol: 99%.

$M_n$: 1800, $M_w$: 690,000, $M_{70}$: 10,000.

EXAMPLE 7

Weighed quantity: 69.93% of orthodichlorobenzene (100 g), 26.60% of 4-chlorophenol, 1.03% of copper-II-oxide, 1.03% of copper-II-chloride, 1.03% of pyridine hydrochloride and 1.38% of N,N,N′,N′-tetramethylethylene diamine.

Conditions: 100 bar air, 1 hour at 150° C. in a 0.3 l autoclave.

Conversion of 4-chlorophenol: 98%.

$M_n$: 1500, $M_w$: 1,175,000, $M_{70}$: 13,000.

EXAMPLES 8 to 12

Weighed quantity: 69.64% of orthodichlorobenzene (100 g), 26.88% of 4-chlorophenol, 1.04% of copper-II-oxide, 1.39% of copper-II-chloride, 1.04% of amine (see Table 1).

Conditions: 100 bar air, 1 hour at 150° C. in a 0.3 l autoclave.

Results: See Table 1.

TABLE 1

| Example No. | Amine | $M_n$ | $M_w$ | $M_{70}$ | % Conversion of 4-chlorophenol |
|---|---|---|---|---|---|
| 8 | pyridine | 1410 | 648,380 | 11,000 | 98 |
| 9 | quinoline | 1260 | 395,100 | 4,800 | 97.5 |
| 10 | isoquinoline | 1310 | 832,140 | 17,000 | 97 |
| 11 | imidazole | 570 | 57,560 | 1,080 | 96 |
| 12 | benzimidazole | 850 | 27,360 | 2,000 | 94 |

EXAMPLE 13

Weighed quantity as in Example 5.

Conditions: 100 bar air, 1 hour at 180° C. in a 1.3 l autoclave.

The product solution is filtered from the catalyst, washed 3 times with 10% hydrochloric acid and then washed neutral with aqueous sodium hydrogen carbonate solution. The solution is concentrated on a rotary evaporator (up to 150° C., up to 2 mbar). Half of the remaining residue (90.3 g) is subjected to fractional precipitation from acetone with n-heptane as precipitation agent. The fractions obtained (see Table) were found to have a substantially uniform chemical composition, with the exception of the lower molecular weight fraction and the remainder according to elemental analysis and the IR, $^1$H-NMR, $^{13}$C-NMR spectra.

EXAMPLES 14 to 17

Weighed quantity: 66.67% of orthodichlorobenzene (100 g), 30.00% of 4-tert-butylphenol, 1.00% of copper-II-oxide, 1.33% of copper-II-choride and 1.00% of amine (see Table 2).

Conditions: 100 bar air, 1 hour at 150° C. in a 0.3 l autoclave.

Results: See Table 2.

TABLE 2

| Example No | Amine | $M_n$ | $M_w$ | $M_{70}$ | % conversion of 4-tert-butylphenol |
|---|---|---|---|---|---|
| 14 | pyridine | 2000 | 258,800 | 5500 | 97 |
| 15 | imidazole | 2000 | 17,000 | 5000 | 96 |
| 16 | 2,5-diamino-2,5-dimethyl-hexane | 1400 | 2,940 | 3300 | 98 |
| 17 | 1,2,4-triazole | 2010 | 575,000 | 13,000 | 35 |

EXAMPLE 18

Weighed quantity: 66.9% of orthodichlorobenzene (430 g), 30.10% of 4-tert-butylphenol, 1.00% of copper-II-oxide, 1.00% of copper-II-chloride and 1.00% of pyridine hydrochloride.

Conditions: 100 bar air, 1 hour at 150° C. in a autoclave.

Working up: the cooled reaction mixture was filtered from the precipitated catalyst (22 g). The filtrate (615 g) was added dropwise for polymer precipitation into a solution of 4214 g of isopropanol and 86 g of aqueous hydrochloric acid with rapid stirring (double disc stirrer, 2800 revolutions per minute). The precipitated material was suction-filtered, dried and produced 99 g of a light yellow powder which softens at from 280° to 300° C. with decomposition.

$M_n$: 3230, $M_w$: 25,100, $M_{70}$: 13,000.

The liquid phase from precipitation was freed from solvent under a vacuum, taken up in methylene chloride, washed neutral with sodium hydrogen carbonate solution and, after drying with sodium sulphate, was concentrated again under a vacuum to dryness. 80 g of a brown, brittle resin having a melting range of 150° to 170° and the following data are obtained.

$M_n$: 900, $M_w$: 5500, $M_{70}$: 2000.

TABLE

Results of fractional precipitation Example 13

| Precipitation Fraction | % by weight | Elemental analysis % by weight | | | | Molecular weight | |
|---|---|---|---|---|---|---|---|
| | | C | H | O | Cl | $M_n$ | $M_w$ |
| Starting substance | 100.00 | 56.15 | 2.5 | 13.4 | 27.7 | 950 | 2630 |
| 1 | 3.13 | 58.5 | 2.6 | 13.5 | 24.5 | 1590 | 18900 |
| 2 | 1.12 | 58.6 | 2.8 | 14.6 | 24.3 | 1320 | 9560 |
| 3 | 4.15 | 58.5 | 2.55 | 14.6 | 24.4 | 1710 | 8830 |
| 4 | 9.28 | 58.4 | 2.6 | 14.3 | 24.3 | 2090 | 5450 |
| 5 | 10.08 | 58.3 | 2.6 | 14.9 | 24.5 | 1970 | 4340 |
| 6 | 7.97 | 58.4 | 2.6 | 13.8 | 24.8 | 2130 | 4160 |
| 7 | 9.00 | 58.4 | 2.55 | 14.4 | 25.0 | 1450 | 2400 |
| 8 | 8.84 | 58.3 | 2.9 | 13.6 | 25.4 | 1040 | 1750 |
| 9 | 10.25 | 58.5 | 2.65 | 13.8 | 25.1 | 1020 | 1510 |
| 10 | 2.33 | 58.3 | 2.6 | 13.7 | 24.3 | 810 | 1150 |
| remainder | 31.56 | 58.8 | 3.65 | 12.8 | 22.9 | 450 | 690 |
| loss | 2.29 | — | — | — | — | — | — |

EXAMPLE 19

A reaction mixture which is reacted as in Example 18 is freed from precipitated catalyst, washed 3 times with 10% hydrochloric acid and dried over sodium carbonate. The solution is freed from light boiling fractions on a rotary evaporator under a vacuum (up to 1 mbar, up to 100° C. bath temperature). The residue thus obtained (170 g) is taken up in 1000 g of boiling isopropanol. During cooling to room temperature, a yellow solid is precipitated and is then suction-filtered, washed and dried.

The solid material (844 g) melts at 310° C. (slight decomposition) and can be characterized by the following data:

$M_n$: 2880, $M_w$: 263,300, $M_{70}$: 9000.

115 g of brown brittle resin having a melting point of 204° C. and the following data is obtained after concentration from the isopropanol phase:

$M_w$: 1600, $M_w$: 282,000, $M_{70}$: 4200.

EXAMPLE 20

The process described in Example 14 is adopted, but methylene chlorides used instead of orthodichlorobenzene.

Conversion of 4-tert-butylphenol: 94%.
$M_n$: 2070, $M_w$: 248,000, $M_{70}$: 5500.

EXAMPLE 21

Weight quantity: 66.90% of orthodichlorobenzene (430 g), 30.10% of 4-tert-butylphenol and 3.0% of the catalyst recovered from Example 18.

Conditions: 100 bar air, 1 hour at 150° C. in a 1.3 l autoclave.

Conversion of 4-tert-butylphenol: 96%.
$M_n$: 3820, $M_w$: 315,000, $M_{70}$: 11,000.

EXAMPLE 22

Weighed quantity: 66.9% of orthodichlorobenzene (430 g), 20.1% of 4-tert-butylphenol, 10.0% of resin with $M_n$ 900 from Example 18, 1.0% of copper-II-oxide, 1.0% of copper-II-chloride and 1.0% of pyridine hydrochloride.

Conditions: 100 bar air, 1 hour at 150° C. in a 1.3 l autoclave.

$M_n$: 3420, $M_w$: 282,000, $M_{70}$: 10,000.

EXAMPLE 23

Weighed quantity: 73.0% of orthodichlorobenzene (100 g), 23.7% of 4-methylphenol, 1.1% of copper-II-oxide, 1.1% of copper-II-chloride and 1.1% of pyridine hydrochloride.

Conditions: 100 bar air, 12 hours at 80° C. in a autoclave.

Conversion of 4-methylphenol: 96%.
$M_n$: 1350, $M_w$: 532,310, $M_{70}$: 10,000 0.3 l.

EXAMPLE 24

Weighed quantity: 71.15% of orthodichlorobenzene (100 g), 26.04% of 3,4-dimethylphenol, 2.01% of copper-I-chloride and 0.71% of pyridine.

Conditions: 100 bar air, 2 hours at 150° C. in a 0.3 l autoclave.

Conversion of 3,4-dimethylphenol: 98%.
$M_n$: 870, $M_w$: 78,600, $M_{70}$: 2500.

EXAMPLE 25

Weighed quantity: 64.54% of orthodichlorobenzene (100 g), 32.91% of 4-phenylphenol, 1.90% of copper-I-chloride and 0.65% of pyridine.

Conditions: 100 bar air, 2 hours at 150° C. in a 0.3 l autoclave

Conversion of 4-phenylphenol: 95%.
$M_n$: 2020, $M_w$: 437,000, $M_{70}$: 10,000.

EXAMPLE 26

Weighed quantity: 59.68% of orthodichlorobenzene (100 g), 37.96% of 4-(1-methyl-1-phenylethyl)-phenol, 1.76% of copper-I-chloride and 0.6% of pyridine.

Conditions: 100 bar air, 2 hours at 150° C. in a 0.3 l autoclave.

Conversion of 4-(1-methyl-1-phenylethyl)-phenol: 97%.

$M_n$: 2050, $M_w$: 80,100, $M_{70}$: 4000.

EXAMPLE 27

Weighed quantity: 65.29% of ortho-dichlorobenzene (100 g), 32.13% of 4-(1,1-dimethylpropyl)-phenol, 1.93% of copper-I-chloride and 0.65% of pyridine.

Conditions: 100 bar air, 2 hours at 150° C. in a 0.3 l autoclave.

Conversion of 4-(1,1-dimethylpropyl)-phenyl: 96%.
$M_n$: 1880, $M_w$: 90,900, $M_{70}$: 4400.

EXAMPLE 28

Weighed quantity: 67.72% of ortho-dichlorobenzene (100 g), 24.38% of 4-tert-butylphenol, 4.48% of 4-hydroxybenzonitrile, 1.02% of copper-II-oxide, 1.01% of copper-II-chloride and 1.02% of pyridine hydrogen chloride.

Conditions: 100 bar air, 1 hour at 150° C. in a 0.3 l autoclave.

Conversion of 4-tert-butylphenol: 95%.
Conversion of 4-hydroxybenzonitrile: 100%.
$M_n$: 1940, $M_w$: 5710, $M_{70}$: 5000.

We claim:

1. A process for the production of polyaryl ethers which comprises oxidizing a phenol in the presence of a catalyst which comprises a copper compound and an organic nitrogen compound in an amount of 0.3 to 4 mols of nitrogen atom per mol of copper ion at an elevated pressure of from 10 to about 1,000 bar wherein said phenol corresponds to formula (I)

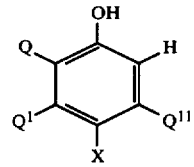

wherein

X is halogen, cyano, alkyl having 1 to 20 carbon atoms, aryl having 6 to 10 carbon atoms, aralkyl having 7 to 20 carbon atoms, cycloalkyl having 5 to 12 carbon atoms, heterocyclic moiety having 5 to 12 ring atoms of which no more than three are hereto atoms,

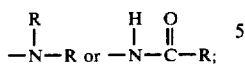

R is alkyl having 1 to 20 carbon atoms, aryl having 6 to 10 carbon atoms, aralkyl having 7 to 20 carbon atoms, cycloalkyl having 5 to 12 carbon atoms or a heterocyclic moiety having 5 to 12 ring atoms of which no more than three are heteroatoms;

Q, $Q^1$ and $Q^{11}$ are independent of one another and each is hydrogen or one of the definitions of X containing not more than three carbon atoms with the proviso that X is not alkyl simulataneously; and any two adjacent substituents X,Q,$Q^1$ and $Q^2$ takent together as a bivalent substituent are

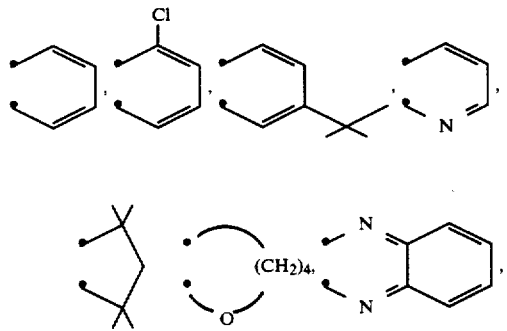

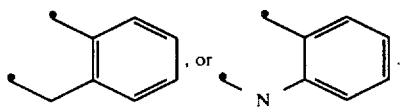

2. Polyaryl ethers produced according to the process of claim 1.

3. Reaction products according to the process of claim 1, characterised in that they contain substantially the structural elements of polyaryl ethers which are bonded in the ortho and/or meta-position and one substituent X per ether-bonded aromatic ring.

4. A process according to claim 1, characterised in that copper or copper compounds and an organic nitrogen base or a phosphorus compound are used as catalyst.

5. A process according to claim 1, characterised in that the phenols corresponding to formula (I) bear, in addition to X, only one substituent different from hydrogen.

6. A process according to claim 1, characterised in that the phenols corresponding to formula (I) bear chlorine or a hydrocarbon radical as the substituent X and all the other substituents are hydrogen.

7. A process according to claim 1, characterised in that two or more different phenols corresponding to formula (I) are used.

8. A process according to claim 1, characterised in that air is used as oxidizing agent.

9. A process according to claim 1, characterised in that oxygen is used in mixtures with nitrogen, carbon dioxide or carbon monoxide.

10. A process according to claim 1, characterised in that organic phosphorus compounds or halogen-containing phosphorus compounds are used as regulators.

11. A process according to claim 1 wherein the elevated pressure is from 30 to 250 bar.

* * * * *

UNITED STATES PATENT AND TRADEMARK OFFICE
CERTIFICATE OF CORRECTION

PATENT NO. : 4,705,843

DATED : November 10, 1987

INVENTOR(S) : Stammann et al

It is certified that error appears in the above-identified patent and that said Letters Patent is hereby corrected as shown below:

In the abstract, change "par-substituted" to read --para-substituted--;

Column 3, change formula (la) from

" 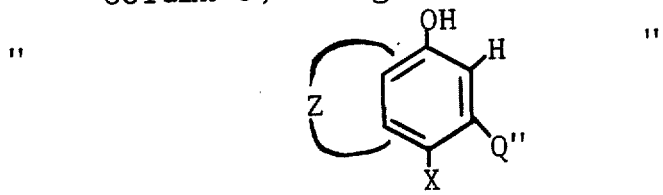 "

to the following:

-- 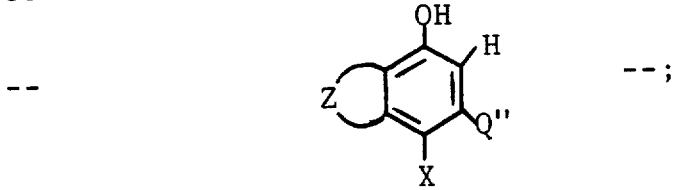 --;

Column 3, line 65, change "2-fluoro 4-tert.-butyl-phenol," to read --2-fluoro-4-tert.butylphenol,--;

Column 5, line 17, change "Hydrates ammonium" to read --Hydrates, ammonium--;

UNITED STATES PATENT AND TRADEMARK OFFICE
CERTIFICATE OF CORRECTION

PATENT NO. : 4,705,843
DATED : November 10, 1987
INVENTOR(S) : Stammann et al

It is certified that error appears in the above-identified patent and that said Letters Patent is hereby corrected as shown below:

Column 5, line 53, change "1,   10-phenanthroline," to read --1,10-phenanthroline,--;

Column 5, line 55, change "-tetrakis (diphenyl-phosphinomethyl)" to read --   -tetrakis(diphenyl-phosphino-methyl)--;

Column 6, line 7, change "oxide cop-" to read --oxide, cop- --;

Column 10, line 46, change "2 reaction samples" to read --2 reaction cycles--;

Signed and Sealed this

Twenty-first Day of June, 1988

Attest:

DONALD J. QUIGG

Attesting Officer

Commissioner of Patents and Trademarks